(12) United States Patent
Onoda et al.

(10) Patent No.: US 12,517,037 B2
(45) Date of Patent: Jan. 6, 2026

(54) EMISSION OPTICAL SYSTEM, EMISSION DEVICE, AND OPTICAL MEASUREMENT DEVICE

(71) Applicant: HAMAMATSU PHOTONICS K.K., Hamamatsu (JP)

(72) Inventors: Hirohisa Onoda, Hamamatsu (JP); Tomokazu Matsumura, Hamamatsu (JP); Fusanori Kondo, Hamamatsu (JP); Naokazu Morishita, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 200 days.

(21) Appl. No.: 18/274,538

(22) PCT Filed: Oct. 15, 2021

(86) PCT No.: PCT/JP2021/038304
§ 371 (c)(1),
(2) Date: Jul. 27, 2023

(87) PCT Pub. No.: WO2022/168374
PCT Pub. Date: Aug. 11, 2022

(65) Prior Publication Data
US 2024/0102916 A1    Mar. 28, 2024

(30) Foreign Application Priority Data
Feb. 2, 2021 (JP) ................. 2021-015041

(51) Int. Cl.
*G01N 21/01* (2006.01)
*G01N 21/64* (2006.01)

(52) U.S. Cl.
CPC ..... *G01N 21/01* (2013.01); *G01N 2021/6478* (2013.01)

(58) Field of Classification Search
CPC ......... G01N 21/8483; G01N 33/54388; G01N 21/6428; G01N 21/78; G01N 21/645;
(Continued)

(56) References Cited

U.S. PATENT DOCUMENTS 7,173,704 B2 * 2/2007 Yamauchi ............... G01N 21/78
422/562
7,173,705 B2 * 2/2007 Yamauchi ............... A61P 31/04
356/432
(Continued)

FOREIGN PATENT DOCUMENTS

| CN | 103163126 A | 6/2013 |
| CN | 209784190 U | 12/2019 |

(Continued)

OTHER PUBLICATIONS

International Preliminary Report on Patentability mailed Aug. 17, 2023 for PCT/JP2021/038304.

*Primary Examiner* — Michael P Stafira
(74) *Attorney, Agent, or Firm* — Faegre Drinker Biddle & Reath LLP

(57) ABSTRACT

An irradiation optical system configured to irradiate an object with first light includes: a light source including a surface emitting element emitting the first light from a light emitting surface; a light shaping member on which the first light emitted from the light source is incident via a light incidence surface and which shapes the incident first light using a light passing hole and emits the shaped first light; and a first lens configured to form an image of the first light emitted from the light shaping member on the object. A distance between the light emitting surface of the surface emitting element and the light incidence surface of the light shaping member is equal to or less than 26 times a size.

19 Claims, 9 Drawing Sheets

(58) Field of Classification Search
CPC .. G01N 33/585; G01N 15/14; G01N 15/1459; G01N 2015/0038; G01N 2015/1493; G01N 2021/6439; G01N 33/54313; G01N 33/5302; G01N 33/54366; G01N 33/54373; G01N 21/6408; G01N 33/558; G01N 33/553; G01N 33/56983; G01N 33/6893; G01N 2021/6463; G01N 2021/7786; G01N 33/543; G01N 15/1425; G01N 21/474; G01N 33/54326; G01N 2021/7759; G01N 21/47; G01N 21/6486; G01N 2800/50; G01N 33/689; G01N 2800/06; G01N 2469/10; G01N 30/90; G01N 33/6887; G01N 21/274; G01N 21/6458; G01N 2800/368; G01N 33/54306; G01N 21/77; G01N 2333/78; G01N 33/54333; G01N 35/00; G01N 33/582; G01N 33/6896; G01N 21/64; G01N 21/648; G01N 33/54386; G01N 2021/473; G01N 2035/00356; G01N 2201/0221; G01N 2201/127; G01N 30/74; G01N 33/48707; G01N 33/50; G01N 2035/00346; G01N 21/6452; G01N 2800/28; G01N 2800/2828; G01N 33/53; G01N 33/533; G01N 33/54346; G01N 35/00029; G01N 2021/1725; G01N 2021/1731; G01N 2021/752; G01N 2021/7796; G01N 21/01; G01N 21/7703; G01N 2201/0624; G01N 1/38; G01N 15/1468; G01N 2001/382; G01N 2021/6478; G01N 2035/00366; G01N 2201/064; G01N 2333/11; G01N 33/48771; G01N 33/5306; G01N 33/542; G01N 33/54387; G01N 33/54393; G01N 1/10; G01N 2021/6471; G01N 2021/8488; G01N 2035/00019; G01N 21/4738; G01N 21/76; G01N 33/48; G01N 33/487; G01N 33/58; G01N 33/726; G01N 33/74; G01N 35/00584; G01N 2021/6421; G01N 2021/6432; G01N 2021/7773; G01N 2021/7783; G01N 2035/00108; G01N 2035/00455; G01N 2035/0427; G01N 2035/0436; G01N 2035/0465; G01N 2035/1025; G01N 21/05; G01N 21/17; G01N 21/75; G01N 2201/062; G01N 2333/59; G01N 2800/52; G01N 33/04; G01N 33/4875; G01N 33/537; G01N 33/723; G01N 33/76; G01N 35/00069; G01N 35/0098; G01N 35/04; G01N 35/1009; G01N 35/1065; G01N 35/1081; G01N 35/1095; G01N 1/44; G01N 2201/12746; G01N 2333/165; G01N 2333/58; G01N 2458/00; G01N 2458/40; G01N 2800/325; G01N 33/48792; G01N 33/52; G01N 33/573; G01N 33/587; G01N 2021/6491; G01N 21/55; G01N 21/554; G01N 21/6454; G01N 21/658; G01N 2201/0636; G01N 2333/08; G01N 2333/475; G01N 2333/705; G01N 27/44791; G01N 27/44795; G01N 2800/2814; G01N 2800/347; G01N 33/493; G01N 33/528; G01N 33/5438; G01N 33/545; G01N 33/569; G01N 33/6854; G01N 33/94; G01N 35/00623; G01N 35/00693; G01N 35/1002; G01N 35/1016; G01N 1/00; G01N 1/4022; G01N 15/10; G01N 2001/4033; G01N 2021/6482; G01N 21/0303; G01N 21/62; G01N 21/6456; G01N 2201/024; G01N 2201/0612; G01N 2201/0813; G01N 2333/005; G01N 2333/195; G01N 2333/43526; G01N 2333/4353; G01N 2333/445; G01N 2333/4712; G01N 2333/71; G01N 2333/75; G01N 2333/76; G01N 2333/805; G01N 2333/908; G01N 2333/916; G01N 2800/065; G01N 2800/324; G01N 2800/34; G01N 30/02; G01N 30/30; G01N 33/49; G01N 33/491; G01N 33/492; G01N 33/497; G01N 33/4975; G01N 33/5005; G01N 33/5308; G01N 33/538; G01N 33/548; G01N 33/56911; G01N 33/574; G01N 33/6863; G01N 33/6872; G01N 33/92; G01N 1/2205; G01N 1/2273; G01N 1/28; G01N 2021/1765; G01N 2021/641; G01N 2021/6441; G01N 2021/6467; G01N 2021/6484; G01N 2021/8908; G01N 2035/00178; G01N 2035/00247; G01N 2035/00495; G01N 2035/0091; G01N 21/25; G01N 21/253; G01N 21/27; G01N 21/314; G01N 21/33; G01N 21/59; G01N 21/643; G01N 2201/0256; G01N 2201/061; G01N 2201/0618; G01N 2201/0638; G01N 2201/12; G01N 2201/125; G01N 2333/183; G01N 2333/185; G01N 2333/471; G01N 2333/5421; G01N 2333/545; G01N 2500/02; G01N 27/3272; G01N 27/333; G01N 27/3335; G01N 27/72; G01N 2800/10; G01N 2800/102; G01N 2800/26; G01N 30/91; G01N 30/92; G01N 31/22; G01N 33/483; G01N 33/48728; G01N 33/48785; G01N 33/532; G01N 33/536; G01N 33/5434; G01N 33/54353; G01N 33/5436; G01N 33/54391; G01N 33/549; G01N 33/559; G01N 33/564; G01N 33/56905; G01N 33/57434; G01N 33/581; G01N 33/6842; G01N 33/6869; G01N 33/72; G01N 33/86; G01N 35/00722

See application file for complete search history.

(56) References Cited

U.S. PATENT DOCUMENTS

2010/0128269 A1    5/2010    Chinowsky et al.
2020/0257098 A1*    8/2020    Shaffer ................ G02B 21/368

FOREIGN PATENT DOCUMENTS

| | | |
|---|---|---|
| CN | 210984098 U | 7/2020 |
| CN | 112236666 A | 1/2021 |
| EP | 1605249 A1 | 12/2005 |
| EP | 3306682 A1 | 4/2018 |
| EP | 3460457 A1 | 3/2019 |
| JP | H9-133628 A | 5/1997 |
| JP | 2002-098631 A | 4/2002 |
| JP | 2003-098078 A | 4/2003 |
| JP | 2007-225400 A | 9/2007 |
| JP | 4448090 B2 | 4/2010 |
| JP | 5664386 B2 | 2/2015 |

(56) References Cited

FOREIGN PATENT DOCUMENTS

| | | | | |
|---|---|---|---|---|
| JP | 2015-510118 A | 4/2015 | | |
| JP | 2017-037041 A | 2/2017 | | |
| JP | 2020-115156 A | 7/2020 | | |
| JP | 2021043181 A * | 3/2021 | ........ | G01M 11/0235 |
| KR | 20190010529 A * | 1/2019 | | |
| WO | 2004/077030 A1 | 9/2004 | | |
| WO | WO-2004/077029 A1 | 9/2004 | | |
| WO | WO-2008094285 A2 * | 8/2008 | ........... | G01N 21/553 |
| WO | WO-2012086376 A1 * | 6/2012 | ......... | G01N 21/5911 |
| WO | WO-2013/119266 A1 | 8/2013 | | |
| WO | WO-2017/199510 A1 | 11/2017 | | |
| WO | WO-2020085452 A1 * | 4/2020 | ......... | G01N 21/5911 |

\* cited by examiner

Fig.8
(a)
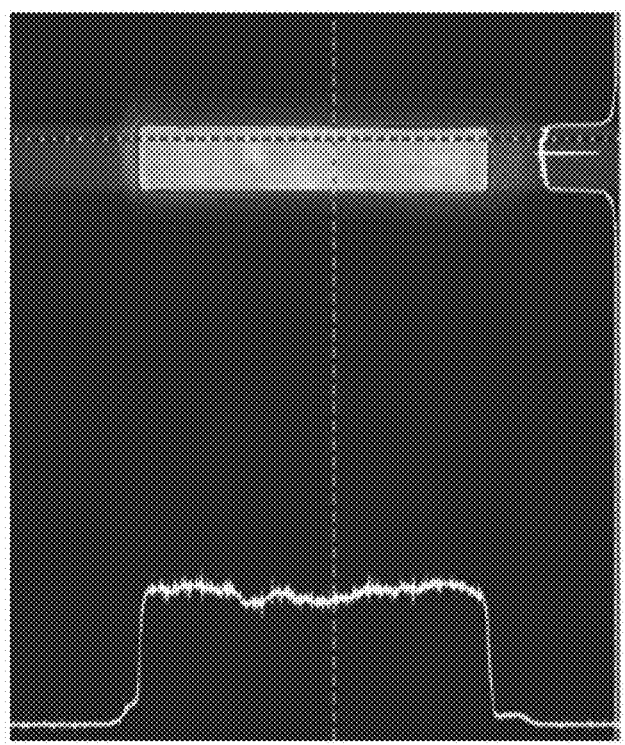
(b)
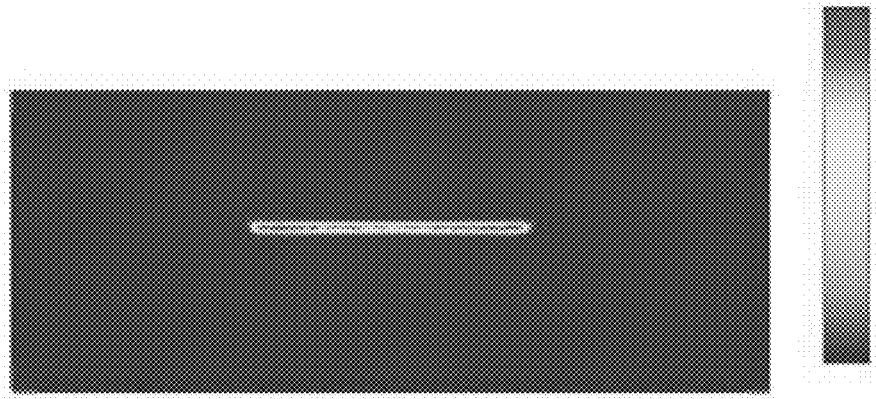

Fig.9
(a) 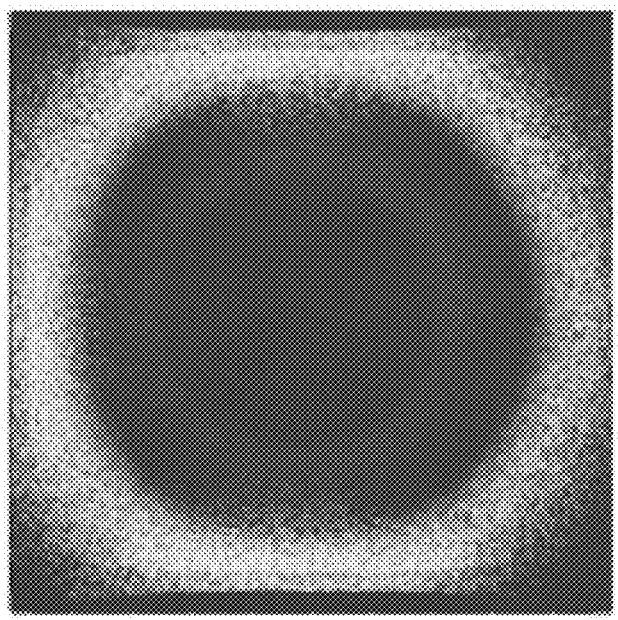
(b) 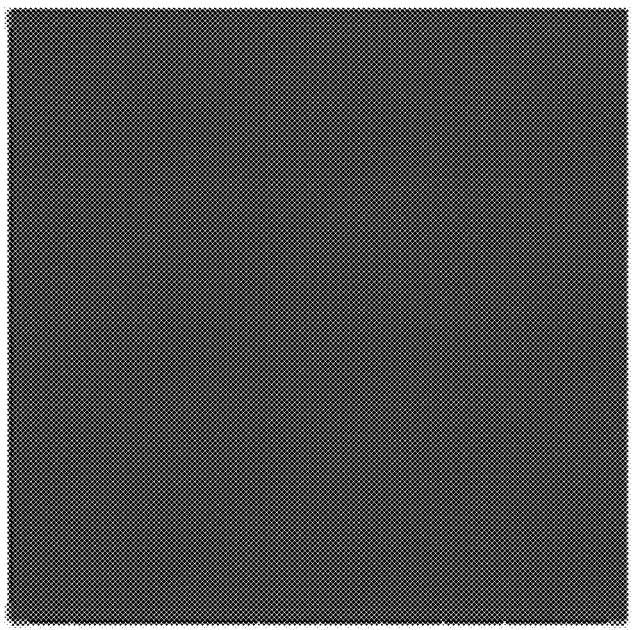

EMISSION OPTICAL SYSTEM, EMISSION DEVICE, AND OPTICAL MEASUREMENT DEVICE

TECHNICAL FIELD

The present disclosure relates to an irradiation optical system, an irradiation device, and an optical measurement device.

BACKGROUND ART

Patent Literature 1 and Patent Literature 2 describe an optical unit that is used for a sample concentration measurement device. The optical unit includes a semiconductor laser serving as a light source, a collimating lens converting a beam emitted from the semiconductor laser to a collimated beam, a cylindrical lens on which the beam passing through the collimating lens is incident via an aperture and a beam splitter and which guides the beam to an immunochromatographic test piece, and an optical bench accommodating these constituents.

In the sample concentration measurement device, a beam emitted from the semiconductor laser is changed to a collimated beam while passing through the collimating lens. The collimated beam is incident on a polarizing beam splitter via an aperture. The beam passing through the polarizing beam splitter is incident on the cylindrical lens, is caused to form an image in a longitudinal direction of the immunochromatographic test piece by the cylindrical lens, and is applied to the immunochromatographic test piece.

CITATION LIST

Patent Literature

[Patent Literature 1] Japanese Unexamined Patent Publication No. 2003-98078
[Patent Literature 2] Japanese Unexamined Patent Publication No. 2002-98631

SUMMARY OF INVENTION

Technical Problem

In the sample concentration measurement device, it is considered that uneven color exhibition in a width direction of an immunochromatographic test piece can be reduced by shaping a beam emitted from the semiconductor laser into an elliptical shape by the cylindrical lens or shaping the beam into a rectangular shape using an aperture and applying the shaped beam to the immunochromatographic test piece with a sample added thereto. However, regarding the optical unit described in Patent Literature 1 and 2, it is mentioned that a beam is shaped into an elliptical shape or a rectangular shape, but uniformization of an illuminance distribution in an irradiation surface of the elliptical or rectangular beam is not mentioned, and a configuration therefor is not provided. Accordingly, in the sample concentration measurement device described in Patent Literature 1 and 2, it is difficult to realize uniform application of light to an immunochromatographic test piece.

The present disclosure provides an irradiation optical system, an irradiation device, and an optical measurement device that enable more uniform light irradiation.

Solution to Problem

An irradiation optical system configured to irradiate an object with first light, the irradiation optical system comprising: a light source including a surface emitting element configured to emit the first light from a light emitting surface and a lens part configured to enhance directivity of the first light emitted from the surface emitting element; a light shaping member on which the first light emitted from the light source is incident via a light incidence surface and which shapes and emits the incident first light by a light passing hole and emits the shaped first light; and a first lens configured to form an image of the first light emitted from the light shaping member on the object, wherein a distance between the light emitting surface of the surface emitting element and the light incidence surface of the light shaping member is equal to or less than 26 times a size in one direction of the light emitting surface.

In the irradiation optical system, first light emitted from the light source is shaped by the light shaping member and is then emitted to an object via the first lens. The light source includes the surface emitting element and the lens part configured to enhance directivity of the first light emitted from the surface emitting element. The distance between the light emitting surface of the surface emitting element and the light incidence surface of the light shaping member is equal to or less than 26 times the size in one direction of the light emitting surface of the surface emitting element. According to knowledge of the inventor, in the surface emitting element used along with the lens part for enhancing directivity, a uniform illuminance distribution with a relatively large light amount is obtained in a short distance range equal to or less than 26 times the size of the light emitting surface. Accordingly, it is possible to perform irradiation of an object with more uniform light by forming an image of the first light on the incidence surface of the light shaping member disposed in the distance range on the object using the first lens. The size in one direction of the light emitting surface of the surface emitting element is, for example, a size in a longitudinal direction when the light emitting surface of the surface emitting element has the longitudinal direction.

The irradiation optical system according to the present disclosure may further include a second lens provided between the light source and the first lens and configured to correct an aberration which is generated in the first lens. In this case, it is possible to perform irradiation with more uniform light.

In the irradiation optical system according to the present disclosure, the second lens may be provided between the light source and the light shaping member or between the light shaping member and the first lens and have a function of enhancing directivity of the first light emitted from the light source. In this case, it is possible to reduce a loss due to diffusion of the first light.

In the irradiation optical system according to the present disclosure, the second lens may be fixed to the light shaping member. In this case, a mechanism for separately holding the second lens is not necessary.

In the irradiation optical system according to the present disclosure, the light source may include a light-transmitting portion with optical transparency configured to seal the surface emitting element, and the lens part may be formed in the light-transmitting portion and be integrated with the surface emitting element. In this case, it is possible to facilitate handling or positioning of the surface emitting element and the lens part.

The irradiation optical system according to the present disclosure may further include a first wavelength selection filter provided between the light source and the first lens and configured to selectively transmit some wavelength components of the first light to the first lens. In this case, it is possible to selectively irradiate an object with some wavelength components of the first light.

An irradiation device according to the present disclosure includes the aforementioned irradiation optical system and a housing accommodating the irradiation optical system, wherein the housing includes a first spatial portion in which an optical path of the first light is formed and a first inner wall surface defining the first spatial portion. With this irradiation device, it is possible to achieve the same advantageous effects as those of the irradiation optical system. With the irradiation device, since the irradiation optical system is accommodated in the housing, it is possible to facilitate handling of the irradiation device.

In the irradiation device according to the present disclosure, a first widened portion widened between the light shaping member and the first lens may be formed in the first spatial portion, and the first inner wall surface may include a first crossing surface crossing an optical path of the first light and facing the light shaping member in the first widened portion. In this case, since light propagating obliquely with a predetermined angle or greater from the light shaping member to the first lens is trapped by the first crossing surface, it is possible to curb generation of stray light.

The irradiation device according to the present disclosure may further include a first light detector provided on the first inner wall surface to face an optical path of the first light and configured to detect a light amount of the first light emitted from the light source by detecting a part of the first light emitted and diffused from the light source. In this case, it is possible to monitor a light amount of the first light.

The irradiation device according to the present disclosure may further include a drive circuit configured to drive the surface emitting element to keep the light amount constant while receiving a detection signal indicating the light amount of the first light from the light detector. In this case, it is possible to perform irradiation with light having a stable light amount.

In the irradiation device according to the present disclosure, the housing may be formed of a material with absorbency for the first light. Alternatively, in the irradiation device according to the present disclosure, the housing may be formed of a material which does not cause autofluorescence in response to the first light. In this case, it is possible to more reliably curb generation of stray light.

An optical measurement device according to the present disclosure includes the aforementioned irradiation device and a detection optical system configured to detect second light from the object irradiated with the first light, wherein the housing further accommodates the detection optical system and includes a second spatial portion in which an optical path of the second light is formed and a second inner wall surface defining the second spatial portion, and the detection optical system includes a second light detector configured to detect the second light and a third lens configured to focus the second light on the second light detector. With this optical measurement device, it is possible to stably measure an object by detecting second light from the object irradiated with uniform light by the irradiation optical system and the irradiation device.

The optical measurement device according to the present disclosure may further include a second wavelength selection filter provided between the third lens and the second light detector and configured to selectively transmit some wavelength components of the second light to the second light detector. In this case, it is possible to selectively detect some wavelength components of the second light.

In the optical measurement device according to the present disclosure, a second widened portion widened between the third lens and the second wavelength selection filter may be formed in the second spatial portion, and the second inner wall surface may include a second crossing surface crossing an optical path of the second light and facing the third lens in the second widened portion. In this case, since light propagating obliquely with a predetermined angle or greater from the third lens to the second wavelength selection filter is trapped by the second crossing surface, an incidence angle range of the second light incident on the second wavelength selection filter is limited. Accordingly, it is possible to reduce an influence of incidence angle dependency of characteristics of the second wavelength selection filter and to perform measurement with high precision.

In the optical measurement device according to the present disclosure, the second wavelength selection filter may include a dielectric multilayer filter and a colored glass filter provided at the second light detector side with respect to the dielectric multilayer filter. In this case, it is possible to reduce incidence angle dependency of the characteristics of the second wavelength selection filter.

The optical measurement device according to the present disclosure may further include a current-voltage converter configured to convert a current signal output from the second light detector in response to detection of the second light to a voltage signal, and the second light detector may be mounted on a substrate of the current-voltage converter. In this case, it is possible to reduce noise.

The optical measurement device according to the present disclosure may further include a metallic shield provided in the housing to cover at least the second light detector and the current-voltage converter. In this case, it is possible to reduce noise.

In the optical measurement device according to the present disclosure, the first light may include excitation light for exciting the object, and the second light may include fluorescent light emitted from the object in response to irradiation with the excitation light.

Advantageous Effects of Invention

According to the present disclosure, it is possible to provide an irradiation optical system, an irradiation device, and an optical measurement device that enable more uniform light irradiation.

BRIEF DESCRIPTION OF DRAWINGS

FIG. 8 is a diagram illustrating a light amount of irradiation light according to the embodiment.

FIG. 9 is a diagram illustrating a light amount of detection light according to the embodiment.

DESCRIPTION OF EMBODIMENTS

Hereinafter, an embodiment will be described in detail with reference to the accompanying drawings. In description with reference to the drawings, the same or corresponding elements will be referred to by the same reference signs and description thereof will not be repeated.

Figure 1:
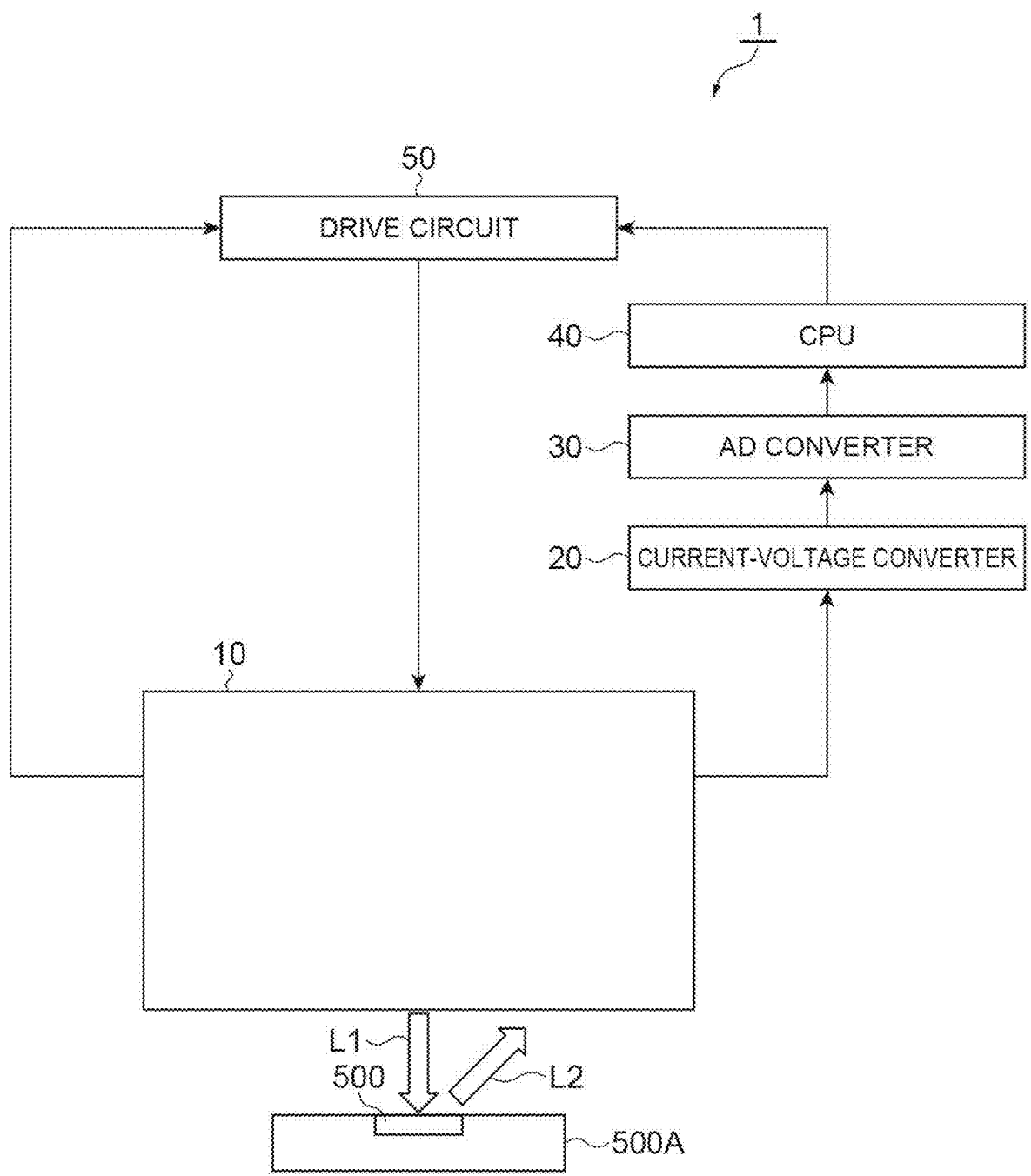
FIG. 1 is a diagram schematically illustrating a configuration of an optical measurement device according to an embodiment.

FIG. 1 is a diagram schematically illustrating a configuration of an optical measurement device according to an embodiment. The optical measurement device 1 illustrated in FIG. 1 is a device that detects light which is generated from a sample in response to light applied to the sample. In this embodiment, the optical measurement device 1 is assumed to be a fluorescence measurement device that detects fluorescent light generated from a sample in response to excitation light applied to the sample. Excitation light is light that excites a sample, and fluorescent light is light which is emitted from the sample in response to the excitation light and which has a wavelength different from the wavelength of the excitation light. In this embodiment, the optical measurement device 1 is assumed to be a device that detects fluorescent light associated with measurement using immunochromatography. Immunochromatography is an immunity measurement method using an antigen-antibody reaction and is used, for example, to detect influenza viruses.

Figure 2:
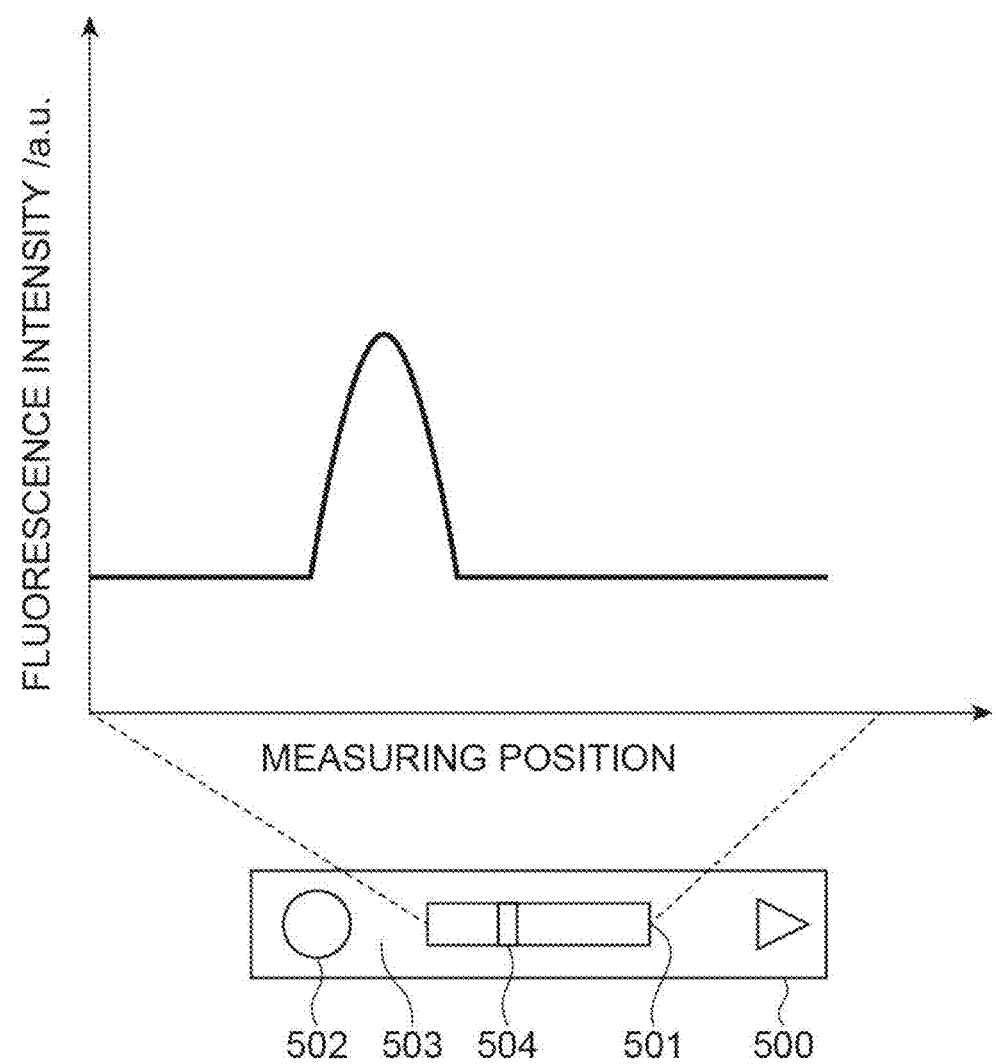
FIG. 2 is a diagram illustrating an example of a test piece illustrated in FIG. 1 and a result of detection.

FIG. 2 is a diagram illustrating an example of a test piece illustrated in FIG. 1 and a result of detection. As illustrated in FIGS. 1 and 2, in measurement using immunochromatography, an immunochromatographic test piece 500 is prepared as a sample. In the immunochromatographic test piece 500, a dropping part 502 on which a sample drops, a holding part 503 which holds a detection antibody marked by a fluorogenic reagent, and a measuring part (an object) 501 in which a captured antibody is fixed to a measurement target part 504 are arranged from upstream to downstream in a reagent holder 500A. The fluorogenic reagent is, for example, europium.

When a sample is dropped on the dropping part 502 of the immunochromatographic test piece 500, the sample moves downstream due to a capillary phenomenon. When the sample includes a substance to be detected, a detection antibody of the holding part 503 and the substance to be detected react to form a complex body, and the complex body moves downstream in the measuring part 501. When the complex body reaches the measurement target part 504 on the measuring part 501, the complex body is captured by a capturing antibody of the measurement target part 504, and a complex body including three of the substance to be detected, the detection antibody, and the capturing antibody is formed.

In this case, when the measuring part 501 which is a measuring area is irradiated with excitation light while changing a focused position (a measurement position), a detection light intensity (a fluorescent light intensity) corresponding to the measurement position can be derived. A measurement position at which the detection light intensity is relatively high is a measurement position corresponding to the position of the measurement target part 504 in which the complex body is captured.

A measuring area in the immunochromatography is located on a line and a fluorescent substance is floating in a place (background) other than the line. Accordingly, when an illuminance distribution of excitation light in the irradiation surface is uneven, it is difficult to perform stable measurement. An amount of fluorescent substance present on the line varies depending on a position thereon, and thus a fluorescence emission distribution is likely to be uneven. In this case, it is also difficult to perform stable measurement. As a result, for the purpose of stable measurement, it is preferable to more uniformize the illuminance distribution of excitation light.

It is conceivable that detection light detected by a detection optical system of the optical measurement device 1 include light based on excitation light in addition to fluorescent light. An example of such light is scattered light of excitation light. The scattered light is, for example, a part of excitation light which is generated by applying excitation light to the immunochromatographic test piece 500 and scattering the excitation light. When an immunochromatographic membrane or a reagent holder 500A of the immunochromatographic test piece 500 is white, the scattered light is more likely to be generated. Excitation light itself may be detected in certain arrangement of a measuring sample or the detection optical system. Accordingly, there is demand for curbing stray light other than fluorescent light to be detected.

Configuration of Optical Measurement Device

Figure 3:
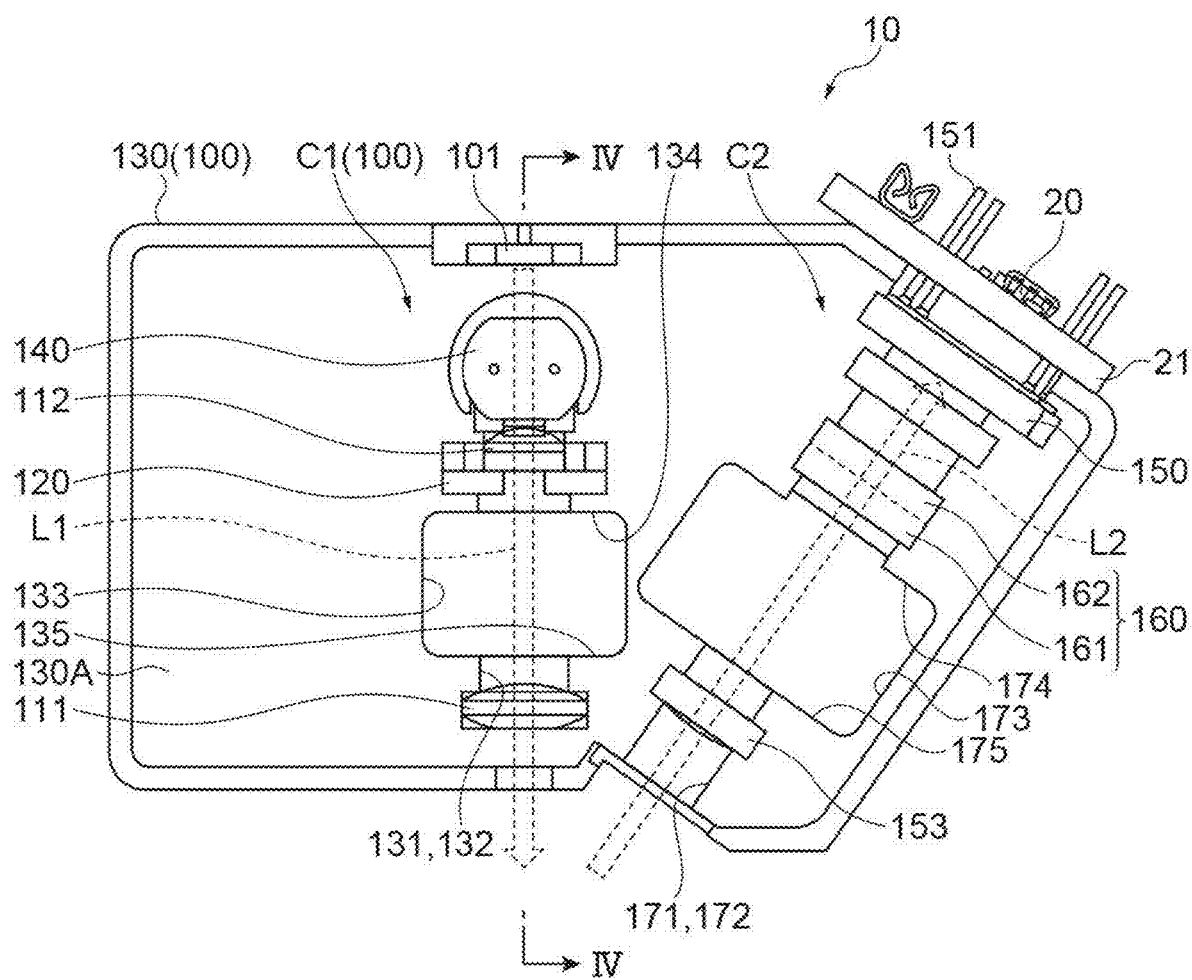
FIG. 3 is a side view schematically illustrating an inner part of the optical measurement device illustrated in FIG. 1.
Figure 4:
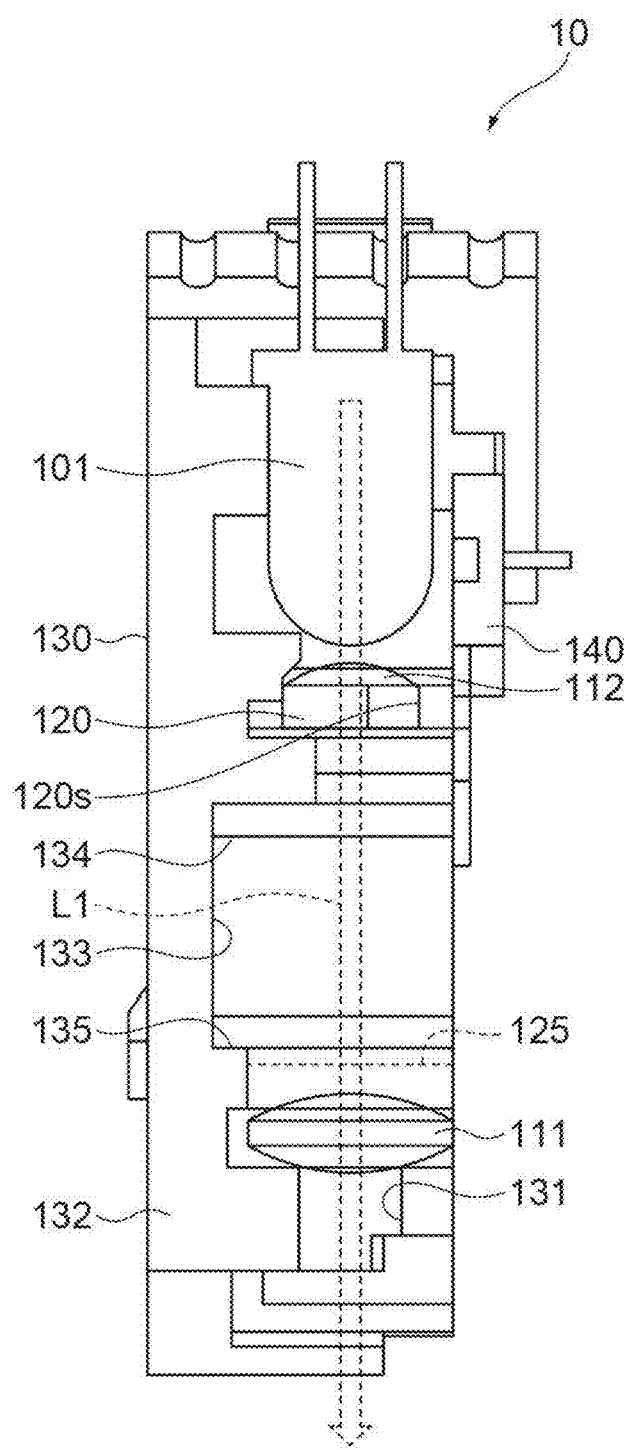
FIG. 4 is a side view schematically illustrating an inner part of the optical measurement device illustrated in FIG. 1 when seen in another direction.
Figure 5:
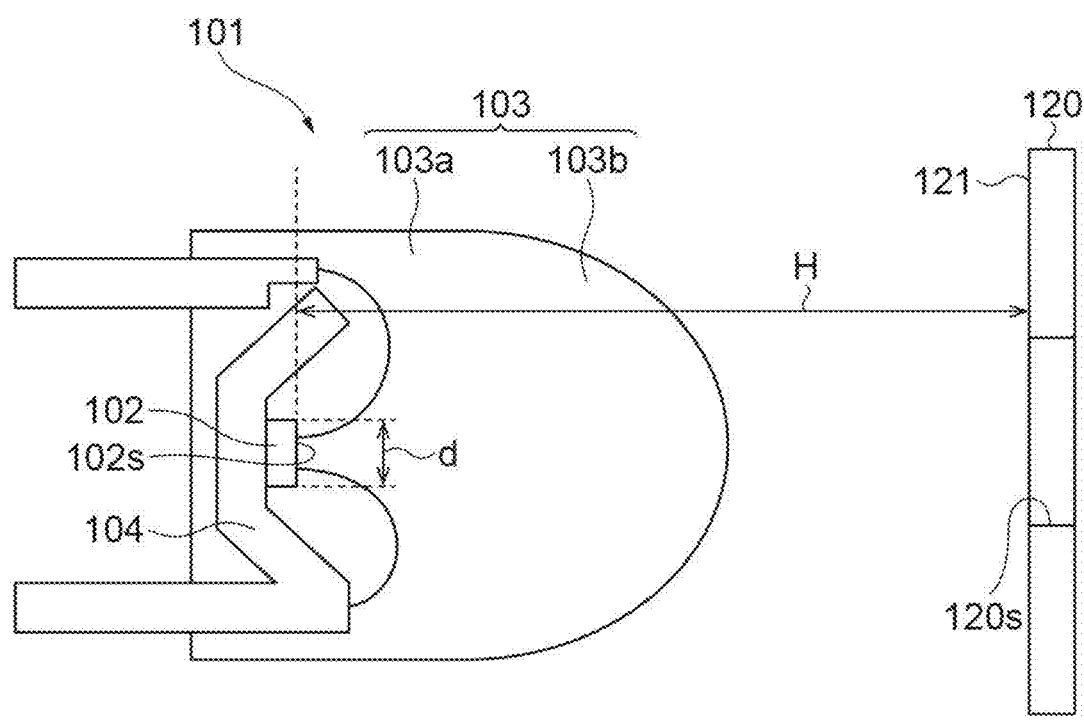
FIG. 5 is a side view illustrating a light source illustrated in FIGS. 3 and 4.

The configuration of the optical measurement device 1 will be described below. FIG. 3 is a side view schematically illustrating an inner part of the optical measurement device illustrated in FIG. 1. FIG. 4 is a side view schematically illustrating an inner part of the optical measurement device illustrated in FIG. 1 when seen in another direction. FIG. 5 is a side view illustrating the light source illustrated in FIGS. 3 and 4. As illustrated in FIG. 1 and FIGS. 3 to 5, the optical measurement device 1 includes an optical head 10. The optical head 10 includes an irradiation optical system C1 and a detection optical system C2. The irradiation optical system C1 irradiates the immunochromatographic test piece 500 with irradiation light (first light) L1. The irradiation light L1 includes excitation light exciting a fluorogenic reagent of the immunochromatographic test piece 500. The irradiation light L1 is, for example, ultraviolet light including a wavelength component of 340 nm. The detection optical system C2 serves to detect detection light (second light) L2 from the immunochromatographic test piece 500. The detection light L2 includes fluorescent light from the fluorogenic reagent of the immunochromatographic test piece 500.

The irradiation optical system C1 will be first described below. The irradiation optical system C1 includes a light source 101, a first lens 111, a second lens 112, a light shaping member 120, a first wavelength selection filter 125, and a first light detector 140. The light source 101, the first lens 111, the second lens 112, the light shaping member 120, the first wavelength selection filter 125, and the first light detector 140 is accommodated in a housing 130, is held by the housing 130, and constitute an irradiation device 100 along with the housing 130.

The light source 101 includes a surface emitting element 102 including a light emitting surface $102s$ and emitting irradiation light L1 from the light emitting surface $102s$, a lens part 103b for enhancing directivity of the irradiation light L1 emitted from the surface emitting element 102, a reflector 104 having the surface emitting element 102 installed therein and reflecting the irradiation light L1 emitted from the surface emitting element 102 to the lens part 103b, and a sealing part 103a sealing the surface emitting element 102 and the reflector 104. The surface emitting element 102 is, for example, a light emitting diode (LED). The light emitting surface 102s is, for example, an area of one end face of the surface emitting element 102 from which the irradiation light L1 is emitted (the whole end face of the surface emitting element 102 in the illustrated example).

The sealing part 103a and the lens part 103b are formed as an integrated member out of a light-transmitting material with optical transparency to the irradiation light L1, for example, a resin with optical transparency, and constitutes a resin part (a light transmitting portion) 103 sealing the surface emitting element 102 and the reflector 104. In other words, the lens part 103b is formed in the light-transmitting resin part 103 to be convex on the opposite side to the surface emitting element 102 and is integrated with the surface emitting element 102. Accordingly, the light source 101 is configured as a shell-shaped LED when the surface emitting element 102 is an LED.

The light shaping member 120 includes a light incidence surface 121 on which the irradiation light L1 emitted from the light source 101 is incident and a slit 120s which is a light passing hole, and shapes and emits the irradiation light L1 incident from the light incidence surface 121 using the slit 120s. The slit 120s is open in the light incidence surface 121. The shape of the slit 120s when seen in a direction parallel to the optical axis of the irradiation light L1 is a shape corresponding to the shape of the measurement target part 504 and is, for example, a rectangular shape having a longitudinal direction.

The light shaping member 120 is provided such that the light incidence surface 121 is separated by a distance H from the light emitting surface 102s of the surface emitting element 102. The distance H between the light emitting surface 102s and the light incidence surface 121 is equal to or less than 26 times a size d in one direction of the light emitting surface 102s. The size d in one direction of the light emitting surface 102s is, for example, a size of one side of a square when the light emitting surface 102s has a square shape, and is a size in a longitudinal direction when the light emitting surface 102s has the longitudinal direction. In the latter, the distance H is less than 26 times a size in a transverse direction of the light emitting surface 102s. The size d is, for example, 0.5 mm.

The irradiation light L1 emitted from the light shaping member 120 via the slit 120s is incident on the first lens 111. The first lens 111 is, for example, a spherical lens that is convex on the light shaping member 120 side and the opposite side to the light shaping member 120 and is provided to form an image of the slit 120s which is an image of the irradiation light L1 emitted from the light shaping member on the immunochromatographic test piece 500. The second lens 112 is provided between the light source 101 and the first lens 111. Here, the second lens 112 is disposed between the light source 101 and the light shaping member 120 and is fixed to the light shaping member 120. The second lens 112 has at least a function of correcting an aberration (for example, a spherical aberration) generated in the first lens 111. Here, the second lens 112 also has a function of enhancing directivity of the irradiation light L1. The second lens 112 is, for example, a lens which is convex on the light source 101 side.

The first wavelength selection filter 125 is provided between the light source 101 and the first lens 111 and serves to selectively transmit some wavelength components of the irradiation light L1 to the first lens 111. The first wavelength selection filter 125 is configured to selectively transmit, for example, a wavelength component (excitation light) contributing to excitation of a fluorogenic reagent of the irradiation light L1. The first wavelength selection filter 125 may have, for example, a configuration in which a dielectric multilayer filter transmitting only a specific wavelength band (excitation wavelengths of the fluorogenic reagent) is deposited on the first lens 111.

The housing 130 includes a first spatial portion 131 in which an optical path of the irradiation light L1 is formed and a first inner wall surface 132 defining the first spatial portion 131. The housing 130 is solid in a region other than the first spatial portion 131 and a second spatial portion 171 which will be described later. In other words, the housing 130 has a configuration in which the first spatial portion 131 and the second spatial portion 171 are formed in a solid main portion 130A. The constituent members of the irradiation optical system C1 are provided in the first spatial portion 131 and are held by the first inner wall surface 132. The housing 130 is formed of a material with at least absorbency for the irradiation light L1. The housing 130 is also formed of a material not causing autofluorescence due to the irradiation light L1. The material of the housing 130 is, for example, a black ABS resin or a black polyoxymethylene (POM).

For example, the first light detector 140 is provided on the first inner wall surface 132 to face the optical path of the irradiation light L1 between the light source 101 and the light shaping member 120. The first light detector 140 serves to detect a light amount of the irradiation light L1 emitted from the light source 101 by detecting a part of the irradiation light L1 emitted from the light source 101 and diffused. The first light detector 140 is, for example, a photodiode (for example, a Si photodiode). The first light detector 140 outputs a signal indicating the result of detection to a drive circuit 50 which will be described later.

A first widened portion 133 that is widened between the light shaping member 120 and the first lens 111 is formed in the first spatial portion 131. Here, the first widened portion 133 is provided between the light shaping member 120 and the first wavelength selection filter 125. The first widened portion 133 is formed by recessing the first inner wall surface 132 to get apart from the optical path of the irradiation light L1. Here, the width of the first widened portion 133 is fixed. The first widened portion 133 has, for example, a rectangular parallelepiped shape. The first inner wall surface 132 includes a pair of crossing surfaces 134 and 135 crossing the optical path of the irradiation light L1 (a direction from the light shaping member 120 to the first lens 111) in the first widened portion 133. The crossing surface 134 is a surface facing the first lens 111, and the crossing surface (a first crossing surface) 135 is a surface facing the light shaping member 120. The crossing surface 134 and the crossing surface 135 are opposite surfaces and are, for example, parallel to each other.

The detection optical system C2 will be described below. The detection optical system C2 includes a second light detector 150, a third lens 153, and a second wavelength selection filter 160. The second light detector 150, the third lens 153, and the second wavelength selection filter 160 are accommodated in the housing 130 and are held by the housing 130.

The second light detector 150 serves to detect detection light L2. The second light detector 150 is, for example, a photodiode (for example, a Si photodiode). The second light detector 150 may be an avalanche photodiode, a photomultiplier tube, or a multi-pixel array thereof. A substrate 21 of a current-voltage converter 20 which will be described later is attached to the outer surface of the housing 130, and the second light detector 150 is mounted on the substrate 21. The second light detector 150 outputs a signal indicating a result of detection of the detection light L2 to the current-voltage converter 20.

The third lens 153 serves to focus the detection light L2 on the second light detector 150. The third lens 153 is, for example, a plano-convex lens that is convex on the opposite side to the second light detector 150.

The second wavelength selection filter 160 is provided between the third lens 153 and the second light detector 150. The second wavelength selection filter 160 serves to selectively transmit some wavelength components of the detection light L2 to the second light detector 150. The second wavelength selection filter 160 is configured to selectively transmit, for example, fluorescent light generated from a fluorogenic reagent out of the detection light L2. Here, the second wavelength selection filter 160 includes a dielectric multilayer filter 161 transmitting only a specific wavelength band (fluorescent light) and a colored glass filter 162. The second wavelength selection filter 160 is, for example, a band-pass filter in which the dielectric multilayer filter 161 and the colored glass filter 162 are combined. The colored glass filter 162 is provided at the second light detector 150 side with respect to the dielectric multilayer filter 161. For example, the colored glass filter 162 is bonded to the dielectric multilayer filter 161.

The housing 130 includes a second spatial portion 171 in which an optical path of the detection light L2 is formed and a second inner wall surface 172 defining the second spatial portion 171. The constituent members of the detection optical system C2 are provided in the second spatial portion 171 and are held by the second inner wall surface 172.

A second widened portion 173 that is widened between the third lens 153 and the second wavelength selection filter 160 is formed in the second spatial portion 171. Here, the second widened portion 173 is formed by recessing the second inner wall surface 172 to get apart from the optical path of the detection light L2. Here, the width of the second widened portion 173 is fixed. The second widened portion 173 has, for example, a rectangular parallelepiped shape. The second inner wall surface 172 includes a pair of crossing surfaces 174 and 175 crossing the optical path of the detection light L2 (a direction from the third lens 153 to the second light detector 150) in the second widened portion 173. The crossing surface (a second crossing surface) 174 is a surface facing the third lens 153, and the crossing surface 175 is a surface facing the second wavelength selection filter 160. The crossing surface 174 and the crossing surface 175 are opposite surfaces and are, for example, parallel to each other. When the second spatial portion 171 does not include the second widened portion 173, the second wavelength selection filter 160 may have a configuration in which a dielectric multilayer filter 161 is deposited on the third lens 153.

As illustrated in FIG. 1, the optical measurement device 1 further includes a current-voltage converter 20, an AD converter 30, a CPU 40, and a drive circuit 50. The current-voltage converter 20 converts a current signal output from the second light detector 150 to a voltage signal and outputs the voltage signal to the AD converter 30. As described above, the substrate 21 of the current-voltage converter 20 is attached to the outer surface of the housing 130 (see FIG. 3). The AD converter 30 converts the voltage signal output from the current-voltage converter 20 to a digital signal and outputs the digital signal to the CPU 40.

The CPU 40 performs, for example, signal processing of removing a signal component based on scattered light from a detection signal on the digital signal output from the AD converter 80. The drive circuit 50 receives an input from the CPU 40 and receives an input from the first light detector 140. The drive circuit 50 controls driving of the surface emitting element 102 such that a light amount of the irradiation light L1 is constant while receiving the detection signal indicating the light amount of the first light L1 from the first light detector 140.

Operations and Advantages

Operations and advantages of the optical measurement device 1, the irradiation optical system C1, and the irradiation device 100 according to this embodiment will be described below.

In the irradiation optical system C1 according to this embodiment, irradiation light L1 emitted from the light source 101 is shaped by the light shaping member 120 and is then applied to an immunochromatographic test piece 500 via the first lens 111. The light source 101 includes the surface emitting element 102 and the lens part 103*b* for enhancing directivity of the irradiation light L1 emitted from the surface emitting element 102. The distance H between the light emitting surface 102*s* of the surface emitting element 102 and the light incidence surface 121 of the light shaping member 120 is equal to or less than 26 times the size d in one direction of the light emitting surface 102*s* of the surface emitting element 102. In this regard, the inventor's knowledge will be described below.

Figure 6:
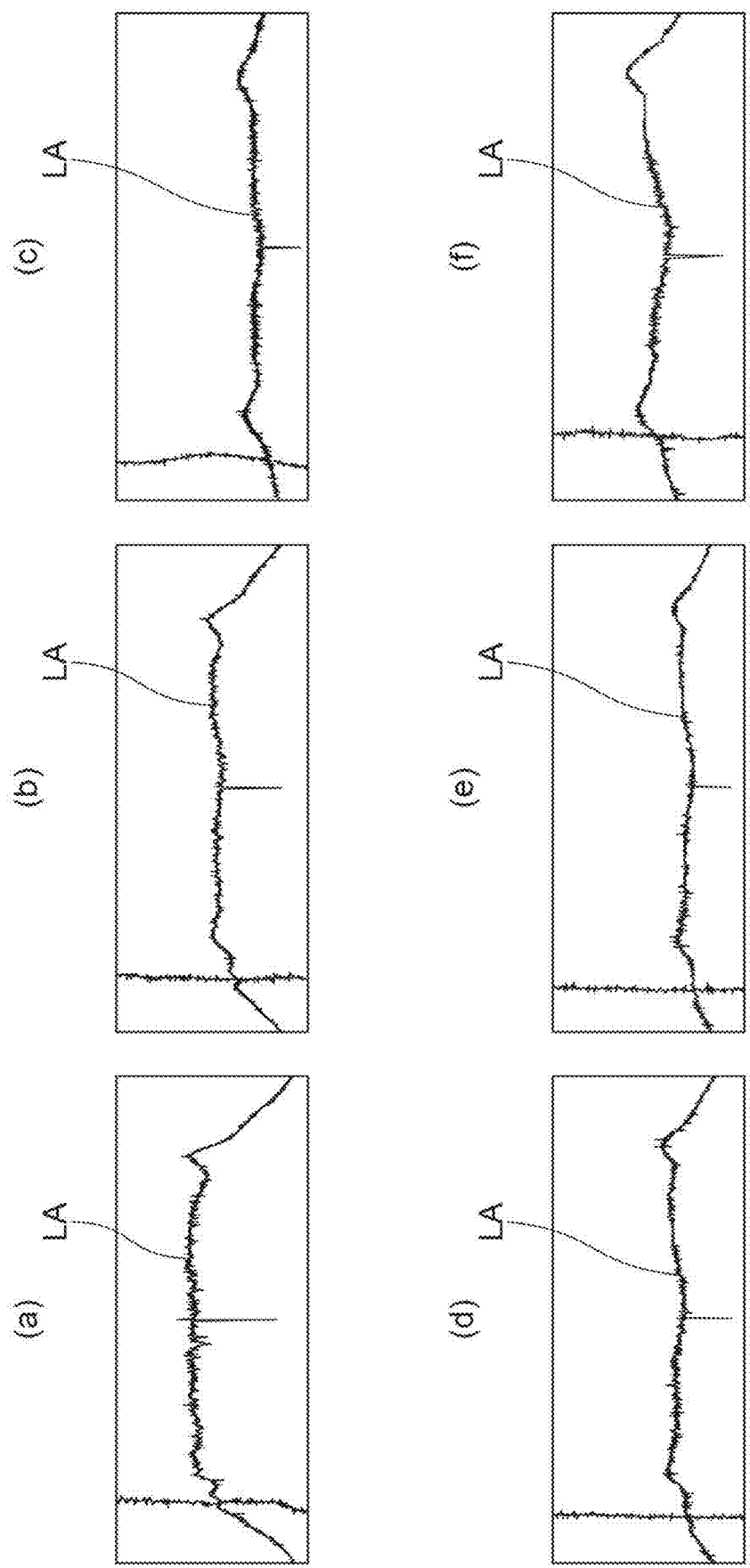
FIG. 6 is a graph illustrating an illuminance distribution of irradiation light in an irradiation surface separated by a predetermined distance from a light emitting surface of a surface emitting element.
Figure 7:
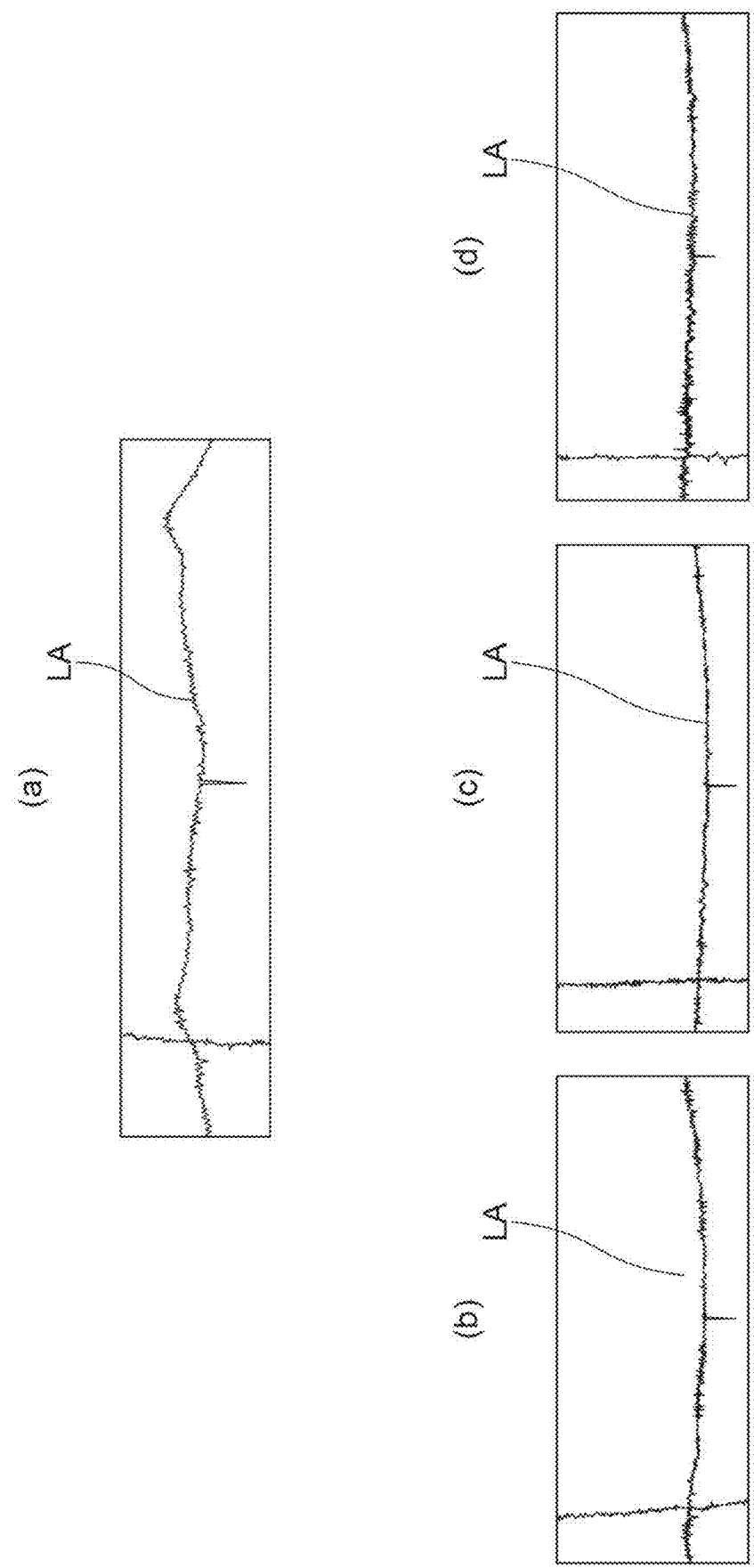
FIG. 7 is a graph illustrating an illuminance distribution of irradiation light in an irradiation surface separated by a predetermined distance from the light emitting surface of the surface emitting element.

FIGS. 6 and 7 are graphs LA illustrating an illuminance distribution of irradiation light in an irradiation surface separated by a specific distance from the light emitting surface of the surface emitting element. FIGS. 6 and 7 illustrate examples in which the size d is 0.5 mm. FIGS. 6(*a*) to 6(*f*) sequentially illustrate cases in which the distance is H=5 mm (10 d), the distance is H=7 mm (14 d), the distance is H=8.5 mm (17 d), the distance is H=9 mm (18 d), the distance is H=10 mm (20 d), and the distance is H=13.5 mm (27 d). FIGS. 7(*a*) to 7(*d*) sequentially illustrate cases in which the distance is H=13 mm (26 d), the distance is H=15 mm (30 d), the distance is H=25 mm (50 d), and the distance is H=35 mm (70 d).

In the cases illustrated in FIGS. 6(*a*) to 6(*e*), that is, when the distance H is in a range of 10 d to 20 d, a relatively uniform illuminance distribution is obtained in the central part and a light amount is relatively high. On the other hand, in the case illustrated in FIG. 6(*f*), that is, when the distance H is 27 d, a middle light amount is obtained and the illuminance distribution is uneven in the central part. On the other hand, in the cases illustrated in FIGS. 7(*b*) to 7(*d*), that is, when the distance H is equal to or greater than 30 d, the distance from the light source is sufficiently large, and thus an even illuminance distribution is obtained as a whole, but a satisfactory light amount is not obtained.

On the other hand, in FIG. 7(*a*) in which the distance H is 26 d, the illuminance distribution in the central part is even in comparison with FIG. 6(*f*) and a large light amount is obtained. In this regard, the knowledge that the illuminance distribution is even and a relatively large light amount is obtained when the distance H is equal to or less than 26 d was obtained. In the surface emitting element 102 which is used along with the lens part 103*b* to enhance directivity in this way, an even illuminance distribution with a relatively large light amount is obtained in a close distance range which is less than 26 times the size d of the light emitting surface 102s.

FIG. 8(a) is a diagram illustrating a light amount of the irradiation light L1 of which an image is formed by the irradiation optical system C1 according to this embodiment. FIG. 8(b) is a diagram illustrating a simulated light amount of the irradiation light L1 of which an image is formed by the irradiation optical system C1 according to this embodiment. As illustrated in FIG. 8, light can be more uniformly emitted to the immunochromatographic test piece 500 by shaping the irradiation light L1 using the light shaping member 120 provided in the aforementioned distance range and forming an image of the irradiation light L1 using the first lens 111.

As described above, in the irradiation optical system C1 according to this embodiment, more uniform light emission to the immunochromatographic test piece 500 is possible by forming an image of the irradiation light L1 in the light incidence surface 121 of the light shaping member 120 (an image of the slit 120s) provided in the aforementioned distance range on the immunochromatographic test piece 500 using the first lens 111. The same advantage can be achieved in the irradiation device 100 and the optical measurement device 1 including the irradiation optical system C1. Particularly, with the optical measurement device 1, it is possible to perform stable measurement by detecting the detection light L2 from the immunochromatographic test piece 500 (a fluorogenic reagent) subjected to uniform irradiation with light using the irradiation optical system C1 and the irradiation device 100.

The irradiation optical system C1 according to this embodiment includes the second lens 112 provided between the light source 101 and the first lens 111 and configured to correct an aberration generated in the first lens 111. Accordingly, it is possible to more uniformly emit light.

In the irradiation optical system C1 according to this embodiment, the second lens 112 is provided between the light source 101 and the light shaping member 120 and has a function of enhancing directivity of the irradiation light L1 emitted from the light source 101. Accordingly, it is possible to reduce a loss due to absorption of the irradiation light L1 by the first inner wall surface 132 based on diffusion of the irradiation light L1.

In the irradiation optical system C1 according to this embodiment, the second lens 112 is fixed to the light shaping member 120. Accordingly, it is not necessary to provide a mechanism for holding the second lens 112 or positioning of the second lens 112.

In the irradiation optical system C1 according to this embodiment, the light source 101 includes a light-transmitting resin part 103 sealing the surface emitting element 102, and the lens part 103b is formed in the resin part 103 and integrated with the surface emitting element 102. Accordingly, it is possible to facilitate handling or positioning of the surface emitting element 102 and the lens part 103b.

The irradiation optical system C1 according to this embodiment includes the first wavelength selection filter 125 provided between the light source 101 and the first lens 111 and configured to selectively transmit some wavelength components of the irradiation light L1 to the first lens 111. Accordingly, it is possible to selectively apply some wavelength components of the irradiation light L1 to the immunochromatographic test piece 500.

The irradiation device 100 according to this embodiment includes the irradiation optical system C1 and the housing 130 accommodating the irradiation optical system C1. The housing 130 includes the first spatial portion 131 in which an optical path of the irradiation light L1 is formed and the first inner wall surface 132 defining the first spatial portion 131. With the irradiation device 100, the same advantages as in the irradiation optical system C1 can be achieved as described above. With the irradiation device 100, since the irradiation optical system C1 is accommodated in the housing, it is possible to facilitate handling thereof.

In the irradiation device 100 according to this embodiment, the first widened portion 133 that is widened between the light shaping member 120 and the first lens 111 is formed in the first spatial portion 131, and the first inner wall surface 132 includes the crossing surface 135 crossing the optical path of the irradiation light L1 in the first widened portion 133 and facing the light shaping member 120. Accordingly, since light propagating obliquely with a predetermined angle or more from the light shaping member 120 to the first lens 111 is trapped by the crossing surface 135, it is possible to curb generation of stray light. That is, the first widened portion 133 and the crossing surface 135 serve as a structure trapping stray light.

The first widened portion 133 is provided between the light shaping member 120 and the first wavelength selection filter 125. In other words, in this embodiment, the first wavelength selection filter 125 is disposed in the back stage of the first widened portion 133 in the optical path of the irradiation light L1. Accordingly, since the light propagating obliquely with a predetermined angle or more to the first wavelength selection filter 125 is trapped by the crossing surface 135, an incidence angle of the irradiation light L1 on the first wavelength selection filter is limited.

For example, the first wavelength selection filter 125 may include a dielectric multilayer filter. In this case, when the incidence angle of the irradiation light L1 on the dielectric multilayer filter increases, filtering characteristics may decrease. Accordingly, by limiting the incidence angle on the first wavelength selection filter 125 using the first widened portion 133 and the crossing surface 135 as described above, it is possible to curb a decrease in filtering characteristics in the first wavelength selection filter 125 and to more reliably selectively transmit only some wavelength components of the irradiation light L1 (to curb generation of stray light).

The effect of curbing stray light using the first widened portion 133 and the crossing surface 135 is particularly effective when the first wavelength selection filter 125 including a dielectric multilayer filter is provided in the back stage thereof, but the present invention is not limited thereto. The effect can be exhibited by simply trapping light propagating obliquely with a predetermined angle or more in the first spatial portion 131.

The irradiation device 100 according to this embodiment includes the first light detector 140 provided in the first inner wall surface 132 to face the optical path of the irradiation light L1 and configured to detect a light amount of the irradiation light L1 emitted from the light source 101 by detecting a part of the irradiation light L1 emitted from the light source 101 and diffusing. Accordingly, it is possible to monitor the light amount of the irradiation light L1.

The irradiation device 100 according to this embodiment includes the drive circuit 50 configured to drive the surface emitting element 102 such that the light amount is constant while receiving the detection signal indicating the light amount of the irradiation light L1 from the first light detector 140. Accordingly, it is possible to perform light irradiation with a stable light amount.

In the irradiation device 100 according to this embodiment, the housing 130 may be formed of a material with absorbency for the irradiation light L1. Alternatively, in the irradiation device 100 according to this embodiment, the housing 130 may be formed of a material not causing autofluorescence due to the irradiation light L1. In this case, it is possible to more reliably curb generation of stray light.

The optical measurement device 1 according to this embodiment includes the irradiation device 100 and the detection optical system C2 configured to detect detection light L2 from an immunochromatographic test piece 500 (a fluorogenic reagent) irradiated with the irradiation light L1. The housing 130 further accommodates the detection optical system C2 and includes the second spatial portion 171 in which an optical path of the detection light L2 is formed and the second inner wall surface 172 defining the second spatial portion 171. The detection optical system C2 includes the second light detector 150 configured to detect the detection light L2 and the third lens 153 configured to focus the detection light L2 on the second light detector 150. With the optical measurement device 1, it is possible to perform stable measurement of the immunochromatographic test piece 500 by detecting the detection light L2 from the immunochromatographic test piece 500 on which uniform light is incident from the irradiation optical system C1 and the irradiation device 100.

The optical measurement device 1 according to this embodiment includes the second wavelength selection filter 160 provided between the third lens 153 and the second light detector 150 and configured to selectively transmit some wavelength components of the detection light L2 to the second light detector 150. Accordingly, it is possible to selectively detect some wavelength components of the detection light L2.

In the optical measurement device 1 according to this embodiment, the second widened portion 173 that is widened between the third lens 153 and the second wavelength selection filter 160 is formed in the second spatial portion 171, and the second inner wall surface 172 includes the crossing surface 174 crossing the optical path of the detection light L2 in the second widened portion 173 and facing the third lens 153. Accordingly, since light propagating obliquely with a predetermined angle or more from the third lens 153 to the second wavelength selection filter 160 is trapped by the crossing surface 174, it is possible to limit a range of the incidence angle of the detection light L2 incident on the second wavelength selection filter 160.

Since the second wavelength selection filter 160 includes the dielectric multilayer filter 161 as described above, the second wavelength selection filter 160 has incidence angle dependency of the filtering characteristics. Accordingly, by limiting the incidence angle on the second wavelength selection filter 160 using the second widened portion 173 and the crossing surface 174 as described above, it is possible to curb a decrease in filtering characteristics in the second wavelength selection filter 160 and to more reliably selectively transmit only some wavelength components of the detection light L2 (to curb generation of stray light). As a result, it is possible to perform measurement with high precision.

This can be understood from the results of detection illustrated in FIG. 9. That is, FIG. 9(a) illustrates a light amount of the detection light L2 in a light receiving surface of the second light detector 150 when a stray light trapping structure using the second widened portion 173 and the crossing surface 174 is not provided, and FIG. 9(b) illustrates a light amount of the detection light L2 in a detection surface of the second light detector 150 when a stray light trapping structure using the second widened portion 173 and the crossing surface 174 is provided. As illustrated in FIG. 9, noise due to stray light is reduced and uniform detection results are obtained by using the stray light trapping structure according to this embodiment.

The effect of curbing stray light using the second widened portion 173 and the crossing surface 174 is particularly effective when the second wavelength selection filter 160 including the dielectric multilayer filter 161 is provided in the back stage thereof, but the present invention is not limited thereto. The effect can be exhibited by simply trapping light propagating obliquely with a predetermined angle or more in the second spatial portion 171.

In the optical measurement device 1 according to this embodiment, the second wavelength selection filter 160 includes the dielectric multilayer filter 161 and the colored glass filter 162 provided at the second light detector 150 side with respect to the dielectric multilayer filter 161. As described above, the characteristics of the dielectric multilayer filter include incidence angle dependency. On the other hand, by providing the colored glass filter 162, it is possible to reduce the incidence angle dependency of the second wavelength selection filter 160 as a whole and to more effectively selectively transmit only some wavelength components in a wider range of incidence angles. Particularly, it is more effective that the dielectric multilayer filter 161 and the colored glass filter 162 are sequentially arranged toward the second light detector 150.

The optical measurement device 1 according to this embodiment includes the current-voltage converter 20 for converting a current signal output from the second light detector 150 in response to detection of the detection light L2 to a voltage signal, and the second light detector 150 is mounted in the substrate 21 of the current-voltage converter 20. Accordingly, it is possible to avoid addition of noise to a detection signal between the second light detector 150 and the current-voltage converter 20 and to reduce noise.

In the optical measurement device according to the present disclosure, the irradiation light L1 includes excitation light for exciting an immunochromatographic test piece 500 (a fluorogenic reagent), and the detection light L2 includes fluorescent light emitted from the immunochromatographic test piece 500 (the fluorogenic reagent) in response to irradiation with the excitation light. Accordingly, it is possible to perform stable measurement of fluorescent light.

The aforementioned embodiment describes an aspect of the present disclosure. Accordingly, the present disclosure is not limited to the embodiment, and the irradiation optical system C1, the irradiation device 100, and the optical measurement device 1 can be arbitrarily modified.

For example, the optical measurement device 1 may include a metallic shield provided in the housing 130 to cover at least the second light detector 150 and the current-voltage converter 20. The metallic shield may be provided, for example, to cover the whole side surface of the housing 130. In this case, it is possible to further reduce noise.

The second lens 112 may be provided between the light shaping member 120 and the first lens 111. In this case, the second lens 112 may be fixed to the light shaping member 120. Here, the second lens 112 may be fixed to the housing 130 separately from the light shaping member 120. The shape of the light passing hole of the light shaping member 120 when seen in a direction parallel to the optical axis of the irradiation light L1 is not limited to the rectangular shape having a longitudinal direction like the slit 120s as long as it is a shape corresponding to the shape of the measurement target part 504, and may be another shape (for example, a circular shape or an elliptical shape).

The first wavelength selection filter 125 and the second wavelength selection filter 160 are not limited to the aforementioned configuration and can be arbitrarily modified. For example, the first wavelength selection filter 125 may include a dielectric multilayer filter and a colored glass filter (which is provided, for example, at the first lens 111 side with respect to the dielectric multilayer filter) similarly to the second wavelength selection filter 160 or may include only the colored glass filter. Similarly, the second wavelength selection filter 160 may include only one of the dielectric multilayer filter 161 and the colored glass filter 162.

The light source 101 is not limited to the configuration as a shell-shaped LED in which the surface emitting element 102 and the lens part 103b are integrated, and the surface emitting element 102 and the lens part 103b may be provided as separate members.

In the aforementioned embodiment, the optical measurement device 1 which is used for fluorescence immunochromatography has been described above, but the optical measurement device 1 may be used for other applications. In this case, the irradiation light L1 may not include excitation light for exciting an object, and the detection light L2 may not include fluorescent light emitted from an object in response to irradiation with excitation light.

INDUSTRIAL APPLICABILITY

It is possible to provide an irradiation optical system, an irradiation device, and an optical measurement device that enable more uniform light irradiation.

REFERENCE SIGNS LIST

1 Optical measurement device
20 Current-voltage converter
50 Drive circuit
100 Irradiation device
101 Light source
102 Surface emitting element
102s Light emitting surface
103 Resin portion (light-transmitting portion)
103b Lens part
111 First lens
112 Second lens
120 Light shaping member
120s Slit (light passing hole)
121 Light incidence surface
131 First spatial portion
132 First inner wall surface
133 First widened portion
135 Crossing surface (first crossing surface)
140 First light detector
150 Second light detector
160 Second wavelength selection filter
161 Dielectric multilayer filter
162 Colored glass filter
171 Second spatial portion
172 Second inner wall surface
173 Second widened portion
174 Crossing surface (second crossing surface)
C1 Irradiation optical system
C2 Detection optical system
L1 Irradiation light (first light)
L2 Detection light (second light)

The invention claimed is:

1. An irradiation optical system configured to irradiate an object with first light, the irradiation optical system comprising:
   a light source including a surface emitting element configured to emit the first light from a light emitting surface and a lens part configured to enhance directivity of the first light emitted from the surface emitting element;
   a light shaping member on which the first light emitted from the light source is incident via a light incidence surface and which shapes and emits the incident first light by a light passing hole and emits the shaped first light; and
   a first lens configured to form an image of the first light emitted from the light shaping member on the object,
   wherein a distance between the light emitting surface of the surface emitting element and the light incidence surface of the light shaping member is equal to or less than 26 times a size in one direction of the light emitting surface, and
   wherein the size in one direction of the light emitting surface is 0.5 mm or less.

2. The irradiation optical system according to claim 1, further comprising a second lens provided between the light source and the first lens and configured to correct an aberration which is generated in the first lens.

3. The irradiation optical system according to claim 2, wherein the second lens is provided between the light source and the light shaping member or between the light shaping member and the first lens, and has a function of enhancing directivity of the first light emitted from the light source.

4. The irradiation optical system according to claim 2, wherein the second lens is fixed to the light shaping member.

5. The irradiation optical system according to claim 1, wherein the light source includes a light-transmitting portion with optical transparency configured to seal the surface emitting element, and
   wherein the lens part is formed in the light-transmitting portion and is integrated with the surface emitting element.

6. The irradiation optical system according to claim 1, further comprising a first wavelength selection filter provided between the light source and the first lens and configured to selectively transmit some wavelength components of the first light to the first lens.

7. An irradiation device comprising:
   the irradiation optical system according to claim 1; and
   a housing accommodating the irradiation optical system, wherein the housing includes:
      a first spatial portion in which an optical path of the first light is formed; and
      a first inner wall surface defining the first spatial portion.

8. The irradiation device according to claim 7, wherein a first widened portion widened between the light shaping member and the first lens is formed in the first spatial portion, and
   wherein the first inner wall surface includes a first crossing surface crossing an optical path of the first light and facing the light shaping member in the first widened portion.

9. An irradiation device comprising:
   an irradiation optical system configured to irradiate an object with first light, the irradiation optical system comprising a light source including a surface emitting element configured to emit the first light from a light emitting surface and a lens part configured to enhance directivity of the first light emitted from the surface emitting element;

a light shaping member on which the first light emitted from the light source is incident via a light incidence surface and which shapes and emits the incident first light by a light passing hole and emits the shaped first light; and a first lens configured to form an image of the first light emitted from the light shaping member on the object, wherein a distance between the light emitting surface of the surface emitting element and the light incidence surface of the light shaping member is equal to or less than 26 times a size in one direction of the light emitting surface, and wherein the size in one direction of the light emitting surface is 0.5 mm or less;

a housing accommodating the irradiation optical system, wherein the housing includes a first spatial portion in which an optical path of the first light is formed, and a first inner wall surface defining the first spatial portion; and a first light detector provided on the first inner wall surface to face an optical path of the first light and configured to detect a light amount of the first light emitted from the light source by detecting a part of the first light emitted and diffused from the light source.

10. The irradiation device according to claim 9, further comprising a drive circuit configured to drive the surface emitting element to keep the light amount constant while receiving a detection signal indicating the light amount of the first light from the first light detector.

11. The irradiation device according to claim 7, wherein the housing is formed of a material with absorbency for the first light.

12. The irradiation device according to claim 7, wherein the housing is formed of a material which does not cause autofluorescence in response to the first light.

13. An optical measurement device comprising:
the irradiation device according to claim 7; and
a detection optical system configured to detect second light from the object irradiated with the first light,
wherein the housing further accommodates the detection optical system and includes:
  a second spatial portion in which an optical path of the second light is formed; and
  a second inner wall surface defining the second spatial portion, and
wherein the detection optical system includes:
  a second light detector configured to detect the second light; and
  a third lens configured to focus the second light on the second light detector.

14. The optical measurement device according to claim 13, further comprising a second wavelength selection filter provided between the third lens and the second light detector and configured to selectively transmit some wavelength components of the second light to the second light detector.

15. The optical measurement device according to claim 14, wherein a second widened portion widened between the third lens and the second wavelength selection filter is formed in the second spatial portion, and
wherein the second inner wall surface includes a second crossing surface crossing an optical path of the second light and facing the third lens in the second widened portion.

16. The optical measurement device according to claim 14, wherein the second wavelength selection filter includes a dielectric multilayer filter and a colored glass filter provided at the second light detector side with respect to the dielectric multilayer filter.

17. The optical measurement device according to claim 13, further comprising a current-voltage converter configured to convert a current signal output from the second light detector in response to detection of the second light to a voltage signal,
wherein the second light detector is mounted on a substrate of the current-voltage converter.

18. The optical measurement device according to claim 17, further comprising a metallic shield provided in the housing to cover at least the second light detector and the current-voltage converter.

19. The optical measurement device according to claim 13, wherein the first light includes excitation light for exciting the object, and
wherein the second light includes fluorescent light emitted from the object in response to irradiation with the excitation light.

* * * * *